US010697493B2

(12) United States Patent
Malychok et al.

(10) Patent No.: US 10,697,493 B2
(45) Date of Patent: Jun. 30, 2020

(54) CAM FOLLOWER WITH MULTIPLE ROWS OF INDEPENDENTLY OPERATING BEARINGS (71) Applicant: Roller Bearing Company of America, Inc., Oxford, CT (US)

(72) Inventors: Roman Malychok, Jamison, PA (US); Lyudmyla Malychok, Jamison, PA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 16/276,492

(22) Filed: Feb. 14, 2019

(65) Prior Publication Data
US 2019/0264738 A1    Aug. 29, 2019

Related U.S. Application Data (60) Provisional application No. 62/630,951, filed on Feb. 15, 2018.

(51) Int. Cl.
| F16C 19/54 | (2006.01) |
| F16C 19/28 | (2006.01) |
| F16H 53/06 | (2006.01) |
| F16C 13/02 | (2006.01) |
| F16C 13/00 | (2006.01) |
| F16C 33/78 | (2006.01) |

(52) U.S. Cl.
CPC ............ *F16C 19/54* (2013.01); *F16C 13/006* (2013.01); *F16C 13/022* (2013.01); *F16C 19/28* (2013.01); *F16C 33/7856* (2013.01); *F16H 53/06* (2013.01)

(58) Field of Classification Search
CPC ........ F16C 13/006; F16C 13/02; F16C 19/08; F16C 19/28; F16C 19/54; F16C 33/7859; F16C 33/7879; F16C 33/7856; F16H 53/06
USPC .......................................................... 384/58
See application file for complete search history.

(56) References Cited

U.S. PATENT DOCUMENTS

| 3,309,155 | A | * | 3/1967 | Palmer | ..................... F16C 19/54 |
| | | | | | 384/540 |
| 5,531,137 | A | | 7/1996 | Guilford | |
| 5,735,214 | A | * | 4/1998 | Tsuboi | .................. F16C 29/005 |
| | | | | | 104/106 |
| 6,692,155 | B2 | | 2/2004 | Shimomura et al. | |
| 7,390,128 | B2 | | 6/2008 | Shimomura et al. | |

(Continued)

FOREIGN PATENT DOCUMENTS

| CN | 105300247 A | 2/2016 |
| CN | 207864420 U | 9/2018 |

(Continued)

*Primary Examiner* — James Pilkington
(74) *Attorney, Agent, or Firm* — Murtha Cullina LLP (57) ABSTRACT A roller assembly includes two outer rings rotatably mounted on a shaft by a respective set of rollers positioned between the shaft and each of the respective one of the outer rings. The shaft has a head flange on one end thereof and a groove formed therein at a distance from the head flange. A retainer ring is positioned in the groove and another retainer ring is secured to the shaft at a distance from the groove. The retaining ring is configured to space the two outer rings apart from one another so that the two outer rings are operable and rotatable independent from one another.

15 Claims, 7 Drawing Sheets (56) References Cited

U.S. PATENT DOCUMENTS

| | | |
|---|---|---|
| 10,088,029 B1 | 10/2018 | Singh |
| 2016/0160922 A1 | 6/2016 | Pallini et al. |
| 2018/0149257 A1 | 5/2018 | Prescavage et al. |

FOREIGN PATENT DOCUMENTS

| | | |
|---|---|---|
| DE | 10112796 A1 | 10/2001 |
| DE | 102014105710 A1 | 7/2015 |
| DE | 102017103585 A1 | 8/2018 |
| DE | 102017119122 A1 | 10/2018 |
| EP | 1234128 B1 | 9/2003 |
| EP | 3336370 A1 | 6/2018 |
| FR | 2002863 A1 | 10/1969 |
| FR | 2352206 A1 | 12/1977 |
| FR | 2418375 A1 | 9/1979 |
| GB | 812328 A | 4/1959 |
| JP | 2683130 B2 | 11/1997 |
| JP | 2001003932 A | 1/2001 |
| JP | 2009293392 A | 12/2009 |
| JP | 2011208631 A | 10/2011 |
| JP | 5515475 B2 | 6/2014 |
| JP | 2018040259 A | 3/2018 |
| JP | 6347928 B2 | 6/2018 |
| JP | 2018123846 A | 8/2018 |
| JP | 2018132073 A | 8/2018 |
| KR | 20030070826 A | 9/2003 |
| WO | 2011111418 A1 | 9/2011 |

\* cited by examiner

CAM FOLLOWER WITH MULTIPLE ROWS OF INDEPENDENTLY OPERATING BEARINGS

CROSS REFERENCE TO RELATED APPLICATIONS

This application claims priority to commonly owned and Provisional Application No. 62/630,951, entitled Cam Follower with Multiple Rows of Independently Operating Bearings," filed Feb. 15, 2018, the entirety of which is incorporated herein by reference.

FIELD OF THE INVENTION

The present invention relates generally to a cam follower and more particularly to a cam follower having two rows of independently operating roller bearings.

BACKGROUND OF THE INVENTION

Cam follower assemblies are used in many industrial manufacturing and conveying applications. The cam follower assemblies typically include an outer ring disposed around an inner ring or stud with a plurality of rolling elements such as needle rollers disposed in a cavity therebetween. In some cam follower assemblies, there are two rows of cylindrical rollers rotatingly contained inside a single outer ring.

Figure 1:
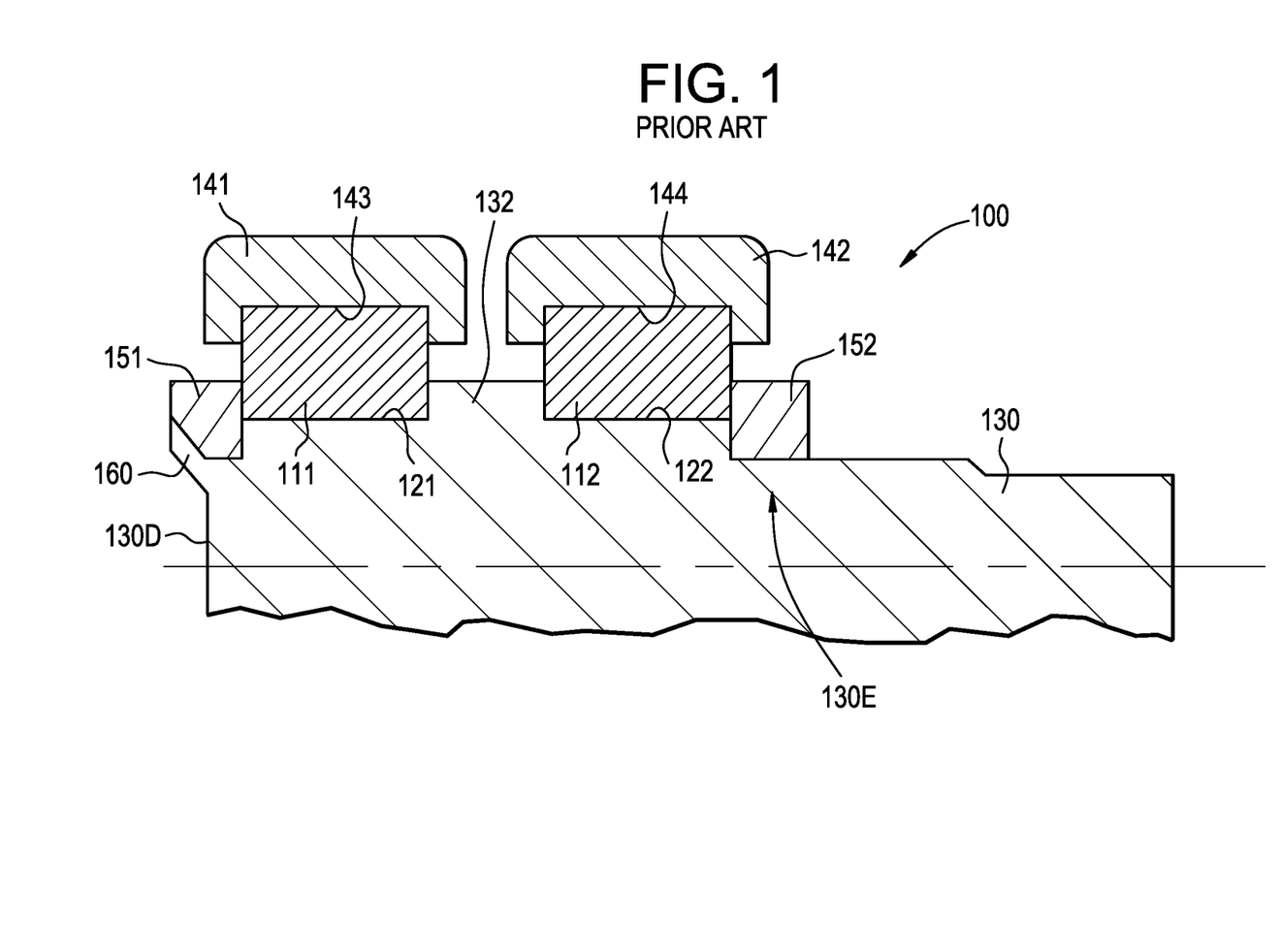
FIG. 1 is a cross sectional schematic view of a prior art roller assembly.

As shown in FIG. 1, one prior art cam follower assembly 100 includes two rows of rollers 111 and 112 surrounding and in rolling engagement with exterior bearing surfaces 121 and 122 of a stud or shaft 130. The stud 130 has an outwardly protruding shoulder 132 that is integral with the stud 130. A first outer ring 141 surrounds the first row of rollers 111; and a second outer ring 142 surrounds the second row of rollers 112. A first end plate 151 is swaged 160 onto the stud 130 at a distal end 130D of the stud 130. The first end plate 151 and the shoulder 132 axially retain the first row of rollers 111 therebetween. A second end plate 152 is interference fit onto the stud 130 at an intermediate area 130E of the stud 130. The second end plate 152 and the shoulder 132 axially retain the second row of rollers 112 therebetween. The first row of rollers 111 rollingly engage an inner bearing surface 143 of the first outer ring 141; and second row of rollers 112 rollingly engage an inner bearing surface 144 of the second outer ring 142.

The prior art cam follower assembly 100 is typically used in applications that operate with rapid changes in the direction of rotation of the outer rings 141 and 142. However, the cam follower 100 can experience catastrophic failure of the swaged area 160 and unintentional disassembly when the cam follower 100 is subject to high thrust loads. The cam follower 100 is difficult to manufacture because the formation of the shoulder 132 requires additional machining operations and waste of material. In addition, the formation of the swaged area 160 complicates the assembly process, for example, by requiring the first row of rollers 111 to be installed via the distal end 130D, installing the first end plate 151 and swaging 160 the first end plate 151 to the stud 130; and by requiring the second row of rollers 112 to be installed via an opposing end of the stud 130 and securing the second end plate 152 to the stud 130.

Based on the foregoing, there is a need for cam follower assemblies that are easy to assembly and can withstand high thrust loads.

SUMMARY

There is disclosed herein, a roller assembly for a cam follower. The roller assembly includes a first outer ring that has a first interior area. The first interior area is defined by a first inner surface that extends between a first axial end and a second axial end of the first outer ring. The first inner surface has a first radially inward facing bearing surface extending between a first radially inwardly extending flange and a second radially inwardly extending flange. The first radially inwardly extending flange has a first axially inward facing abutment surface; and the second radially inwardly extending flange has a second axially inward facing abutment surface. The roller assembly includes a second outer ring that has a second interior area. The second interior area is defined by a second inner surface that extends between a third axial end and a fourth axial end of the second outer ring. The second inner surface has a second radially inward facing bearing surface that extends between a third radially inwardly extending flange and a fourth radially inwardly extending flange. The third radially inwardly extending flange has a third axially inward facing abutment surface; and the fourth radially inwardly extending flange has a fourth axially inward facing abutment surface. A one piece shaft (e.g., a solid integrally formed stud) extends into the first interior area and the second interior area. The shaft extends continuously between a terminal axial end and a mounting axial end of thereof. The shaft has a head flange that extends radially outward from the shaft proximate the terminal axial end. The head flange has a fifth axially inward facing abutment surface. The shaft has an exterior bearing surface that extends between the third axially inward facing abutment surface and a circumferentially extending retainer receiving surface. The retainer receiving surface is located between the terminal axial end and the mounting axial end. The shaft has a circumferential groove that extends around the shaft. The groove is located between the terminal axial end and the retainer receiving surface. A first row of a plurality of first rollers is positioned in the first interior area between and in rolling engagement with the exterior bearing surface and the first radially inward facing bearing surface. A second row of a plurality of second rollers is positioned in the second interior area between and in rolling engagement with the exterior bearing surface and the second radially inward facing bearing surface. A first retainer ring is disposed in the groove. A portion of the first retainer ring extends radially outward from the groove, to form an abutment shoulder. A second retainer ring or washer is secured to the retainer receiving surface. A first spacer ring is disposed around and engages the exterior bearing surface. The first spacer ring is positioned between the first row of the plurality of first rollers and the first retainer ring. A second spacer ring is disposed around and engages the exterior bearing surface. The second spacer ring is positioned between the second row of the plurality of second rollers and the first retainer ring. The first outer ring is axially retained on the first row of the plurality of first rollers by and between the first axially inward facing abutment surface and the second axially inward facing abutment surface. The first row of the plurality of first rollers and the first spacer are axially retained on the shaft by and between the head flange and the first retainer ring. The second outer ring is axially retained on the second row of the plurality of second rollers by and between the third axially inward facing abutment surface and the fourth axially inward facing abutment surface. The second row of the plurality of second rollers and the second spacer are axially retained on the shaft by and between the first retainer ring and the washer. The first spacer ring, the second spacer ring and/or the first retainer ring are configured to space the first outer ring apart from and in a predetermined axial relation to the second outer ring so that the first outer ring and the second outer ring are rotatable independent of one another.

In one embodiment, the first inner surface has a first seal receiving pocket formed between the first radially inwardly extending flange and the first axial end. A first annular seal is positioned in and seated in the first seal receiving pocket. A portion of the first annular seal slidingly and sealingly engages a portion of the head flange.

In one embodiment, the first inner surface has a second seal receiving pocket formed between the second radially inwardly extending flange and the second axial end. A second annular seal is positioned in and seated in the second seal receiving pocket. A portion of the second annular seal slidingly and sealingly engages a portion of the first spacer ring.

In one embodiment, the second inner surface has a third seal receiving pocket formed between the third radially inwardly extending flange and the third axial end. A third annular seal is positioned in and seated in the third seal receiving pocket. A portion of the third annular seal slidingly and sealingly engages a portion of the washer.

In one embodiment, the second inner surface has a fourth seal receiving pocket formed between the fourth radially inwardly extending flange and the fourth axial end. A fourth annular seal is positioned in and seated in the fourth seal receiving pocket. A portion of the fourth annular seal slidingly and sealingly engages a portion of the second spacer ring.

In one embodiment, the first annular seal, the second annular seal, the third annular seal and/or the fourth annular seal is made from an elastomeric material.

In one embodiment the shaft is made from a carbon steel alloy such as AISI 51200. In one embodiment, a portion of the shaft has a carburized case hardened case depth of 0.76 to 1.02 millimeters (0.03 to 0.04 inches). In one embodiment, the shaft has a surface hardness of 59 to 62 Rockwell C scale. In one embodiment, the shaft has a core hardness of 30 to 35 Rockwell C scale.

In one embodiment, the shaft extends outwardly from the first axial end and the second axial end.

DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION OF THE PREFERRED EMBODIMENT

Figure 2A:
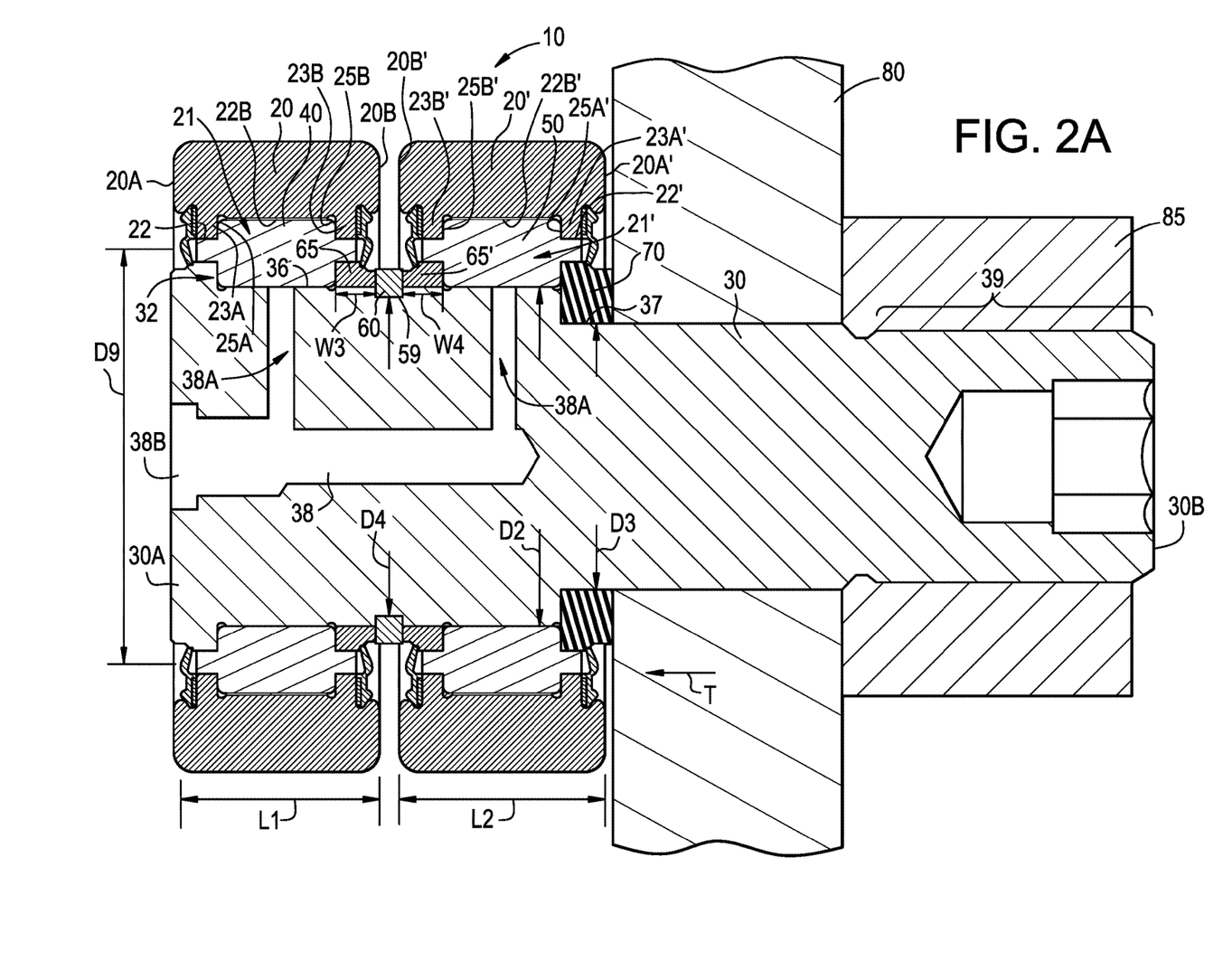
FIG. 2A is a cross sectional view of a roller assembly for a cam follower, of the present invention.

As shown in FIG. 2A, a roller assembly for a cam follower is generally designated by the numeral 10. The roller assembly 10 includes a first outer ring 20 that has a first interior area 21. The first interior area 21 is defined by a first inner surface 22 that extends between a first axial end 20A and a second axial end 20B of the first outer ring 20. The first inner surface 22 has a first radially inward facing bearing surface 22B that is substantially cylindrical. The first radially inward facing bearing surface 22B extends between a first radially inwardly extending flange 23A and a second radially inwardly extending flange 23B. The first radially inwardly extending flange 23A has a first axially inward facing abutment surface 25A; and the second radially inwardly extending flange 23B has a second axially inward facing abutment surface 25B.

As shown in FIG. 2A, the roller assembly 10 includes a second outer ring 20' that has a second interior area 21'. The second interior area 21' is defined by a second inner surface 22' that extends between a third axial end 20A' and a fourth axial end 20B' of the second outer ring 20'. The second inner surface 22' has a second radially inward facing bearing surface 22B' that is substantially cylindrical. The second radially inward facing bearing surface 22B' extends between a third radially inwardly extending flange 23A' and a fourth radially inwardly extending flange 23B'. The third radially inwardly extending flange 23A' has a third axially inward facing abutment surface 25A'; and the fourth radially inwardly extending flange 23B' has a fourth axially inward facing abutment surface 25B'.

While embodiments including two outer rings 20 and 20' are shown, the present invention is not limited in this regard as other configurations may be employed without departing from the broader aspects of the present invention. By way of example, in some embodiments, the roller assembly 10 includes additional outer rings, i.e., a third outer ring (see FIG. 2B), a fourth outer ring, etc., that have associated interior areas, axial ends, radially inward facing bearing surfaces, radially inwardly extending flanges, axially inward facing abutment surfaces, etc. (see FIG. 2B).

Figure 2B:
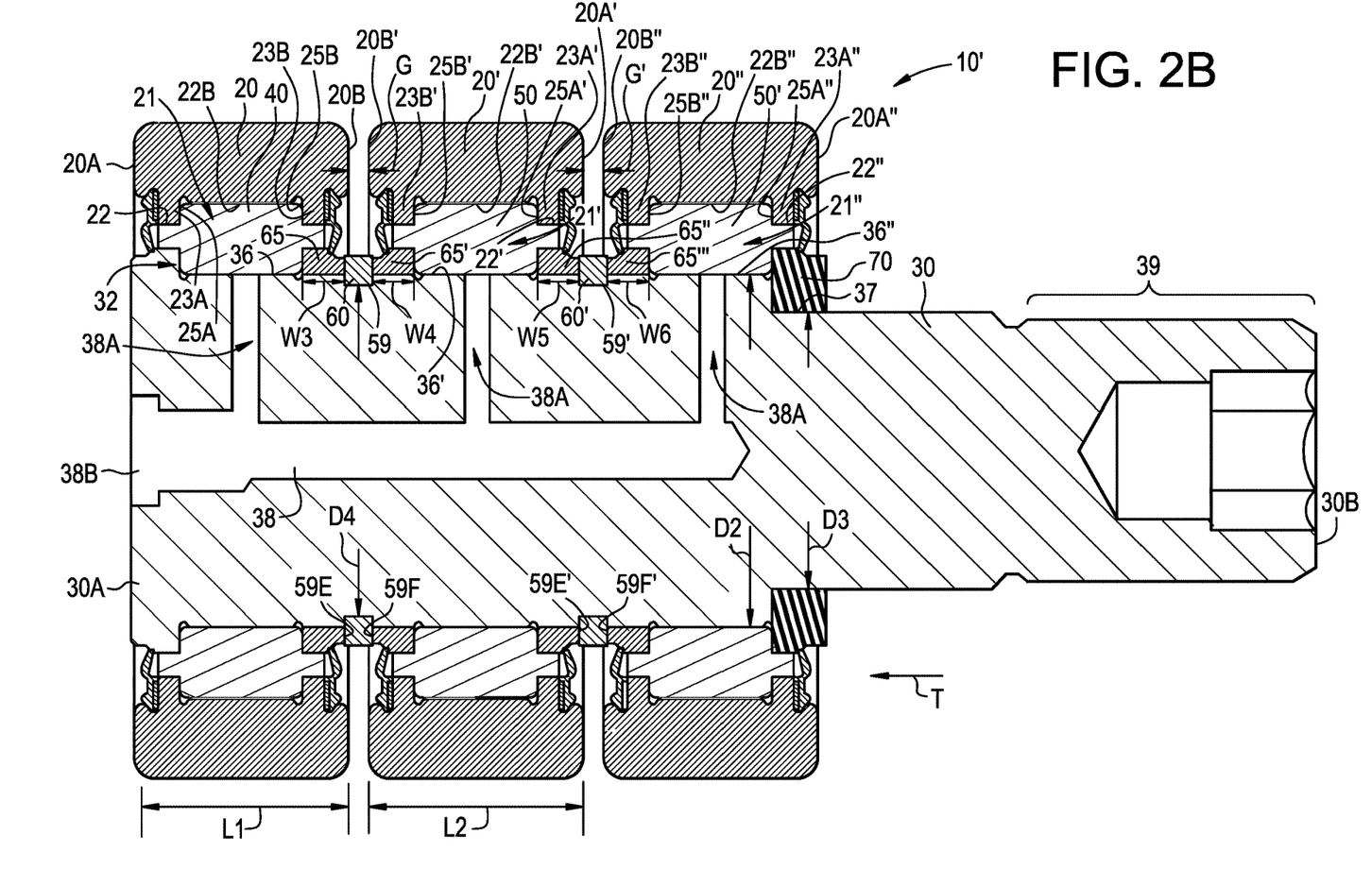
FIG. 2B is a cross sectional view of a roller of a cam follower of the present invention shown with three rows of independently operating bearings.

As shown in FIG. 2B, the roller assembly 10' includes a third outer ring 20" that has a third interior area 21". The third interior area 21" is defined by a third inner surface 22" that extends between a fifth axial end 20A" and a sixth axial end 20B" of the third outer ring 20". The third inner surface 22" has a third radially inward facing bearing surface 22B" that is substantially cylindrical. The third radially inward facing bearing surface 22B" extends between a fourth radially inwardly extending flange 23A" and a fifth radially inwardly extending flange 23B". The fourth radially inwardly extending flange 23A" has a fourth axially inward facing abutments surface 25A"; and the fifth radially inwardly extending flange 23B" has a fifth axially inward facing abutment surface 25B".

Figure 3:
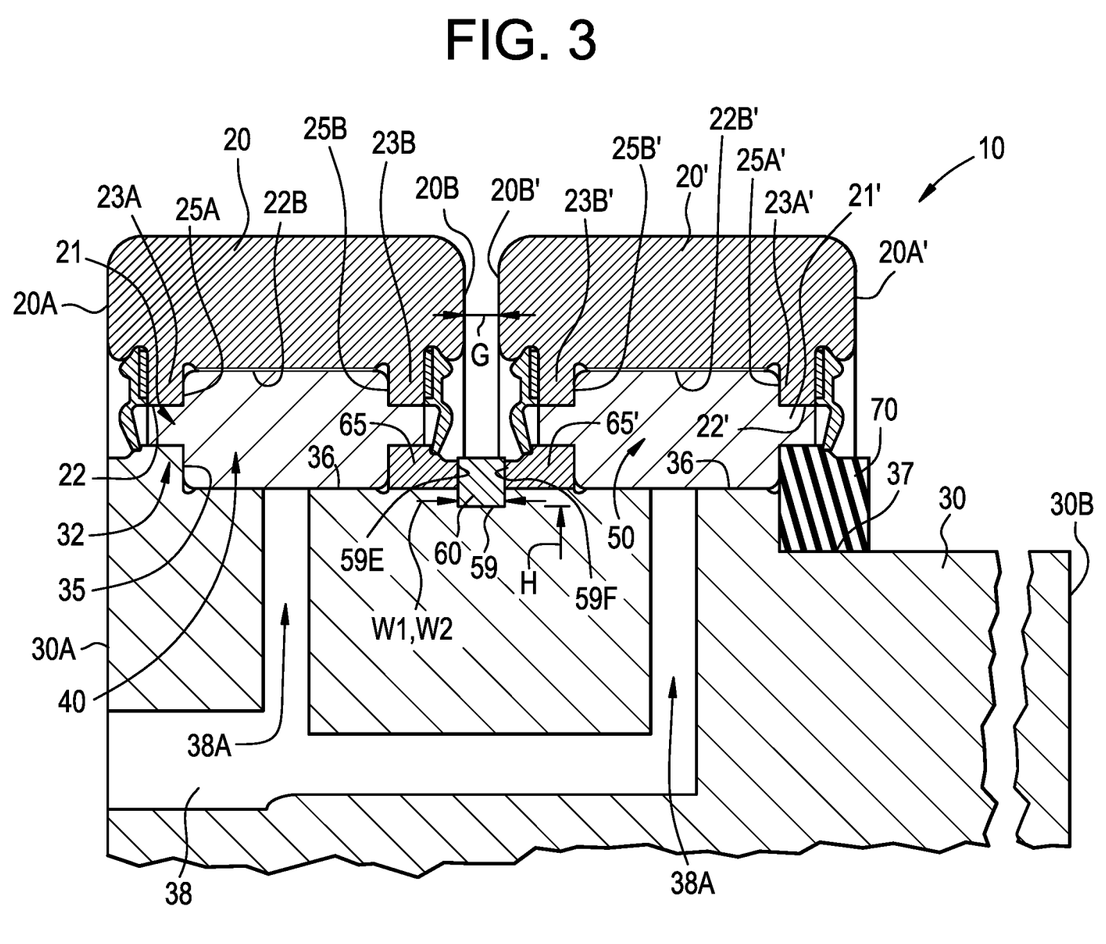
FIG. 3 is an enlarged view of a portion of the roller assembly of FIG. 2A.

As shown in FIGS. 2A and 3, a one piece shaft 30 extends into the first interior area 21 and the second interior area 21' of the first outer ring 20 and the second outer ring 20', respectively. The shaft 30 extends continuously between a terminal axial end 30A and a mounting axial end 30B of the shaft 30. A threaded area 39 (e.g., a male thread, female thread, etc.) is formed on a portion of the shaft 30 proximate the mounting end 30B for mounting (e.g., threading) the shaft 30 into a bore, e.g., having a corresponding female or male threaded area (not shown). The shaft 30 has a head flange 32 extending radially outward from the shaft 30 proximate the terminal axial end 30A thereof. The head flange 32 is integral with the shaft 30 and can withstand greater thrust loads in the direction of the arrow T (see FIG. 2A), compared to swaged area 160 of the prior art roller assemblies 100 shown in FIG. 1. The flanged head 32 also has utility in facilitating simple assembly, by eliminating the need for swaging as shown in the prior art roller assembly 100 of FIG. 1 and by enabling both rollers 40 and the 50 to be installed from the same axial side of the stud 30 into their respective positions.

Figure 7:
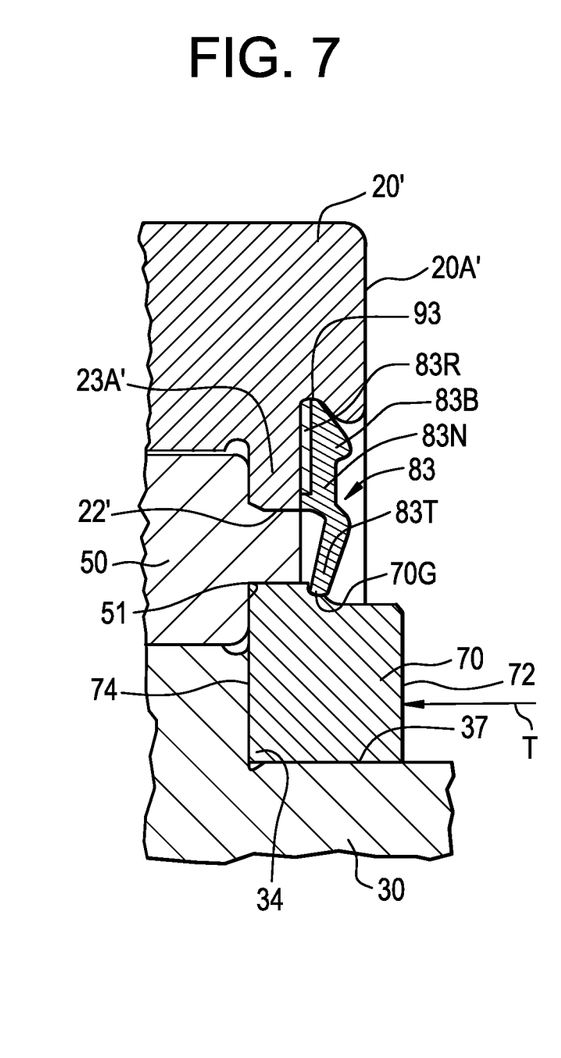
FIG. 7 is an enlarged view of a fourth seal area of the roller assembly of FIG. 2A.

Referring to FIG. 2A, the nut 85 engages the threaded area 39 and pushes the housing 80 against the washer 70, exerting the thrust load T against an axial surface of the washer. The washer 70 and its interaction with the rollers 40, 50 is depicted in detail in FIGS. 7-10. Referring to FIG. 7, the thrust load T acts on outer axial wall 72 of the washer 70. The washer 70 transmits this thrust load T to a shoulder 34 on the shaft 30.

As shown in FIG. 3, the head flange 32 has a fifth axially inward facing abutment surface 35 formed thereon. The shaft 30 has an exterior bearing surface 36 extending between the fifth axially inward facing abutment surface 35 and a circumferentially extending retainer receiving surface 37 (e.g., a cylindrical exterior surface). The exterior bearing surface 36 defines a diameter D2. The retainer receiving surface 37 (e.g., a cylindrical exterior surface) is located between the terminal axial end 30A and the mounting axial end 30B. The retainer receiving surface 37 defines a diameter D3. A circumferential groove 59 extends around the shaft 30. In one embodiment, the groove 59 extends uninterrupted, 360 degrees circumferentially around the shaft 30. In one embodiment, the groove 59 extends radially inward from the exterior bearing surface 36, for example by a variable of constant depth H. Thus, the groove 59 has an outside diameter D4. The groove 59 has an axial width W1. The groove 59 is located between the terminal axial end 30A and the retainer receiving surface 37 of the shaft 30. In some embodiments, additional grooves 59 can be included on shaft 30, as will be discussed in greater detail below.

As shown in FIGS. 2A and 3, in some embodiments, a channel 38 extends axially into the shaft 30. The channel 38 branches radially outward to at least one outlet 38A. Although two outlets 38A are shown in FIGS. 2A and 3, the present invention is not limited in this regard, as any suitable number of outlets may be provided, including but not limited to one outlet, three outlets, or more outlets, etc. In some embodiments, outlets 38A are in communication with at least one of first interior area 21 and second interior area 21'. In some embodiments, channel 38 is in communication with a lubricant fitting 38B, e.g., a zerk fitting. In some embodiments, lubricant fitting 38B is connected to channel 38 via a fastening mechanism, e.g., male and female threaded portions. In some embodiments, lubricant fitting 38B is in communication with a lubricant source. In some embodiments, channel 38, outlets 38A, and lubricant fitting 38B are configured to provide a lubricant from the lubricant source to at least one of first interior area 21 and second interior area 21'. In some embodiments, the lubricant is any suitable lubricant, such as oil or grease.

As shown in FIG. 3, a first row of a plurality of first rollers 40 is positioned in the first interior area 21 of the first outer ring 20, between and in rolling engagement with the exterior bearing surface 36 and the first radially inward facing bearing surface 22B. A second row of a plurality of second rollers 50 is positioned in the second interior area 21' between and in rolling engagement with the exterior bearing surface 36 and the second radially inward facing bearing surface 22B'. The rollers 40 and 50 are, preferably, needle type of cylindrical rollers. In embodiments with additional outer rings, e.g., a third outer ring, fourth outer ring, etc., additional pluralities of rollers are positioned in the associated interior areas, e.g., third interior area, fourth interior area, etc.

Figure 8:
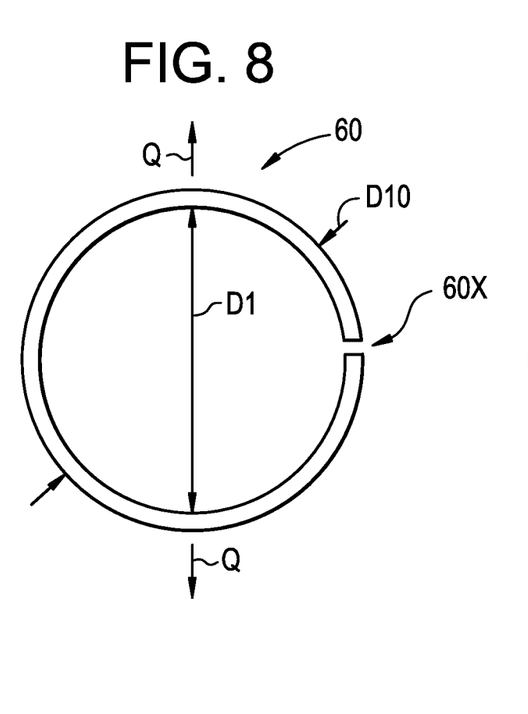
FIG. 8 is side view of a split retaining ring employed in the roller assembly of FIG. 2A.

As shown in FIGS. 3 and 8, a first retainer ring 60 disposed in the groove 59. A portion of the first retainer ring 60 extends radially outward from the groove 59 and is maintained in a fixed axial position in the groove 59 by opposing side walls 59E and 59F of the groove 59. The first retainer ring 60 has an axial width W2 that is about equal to or slightly less than the width W1 of the groove 59. As shown in FIG. 8, the first retainer ring 60 is a split type ring having a radially extending slit 60X extending therethrough. In a relaxed state the first retainer ring 60 has an inside diameter D1 (see FIG. 8) that is greater than the diameter D4 of the groove 59 and less than the diameter D2 of the exterior surface 36 of the shaft 30. The slit 60X allows the first retainer ring 60 to be radially outwardly expandable in the direction of the arrows Q and axially deflectable to allow the diameter D1 to increase to a magnitude greater than the diameter D2 of the exterior surface 36 of the shaft 30, so that the first retainer ring 60 can be expanded over the shaft 30 and snap fit into the groove 59. While a split type ring is shown and described as first retainer ring 60, the present invention is not limited in this regard as other configurations may be employed including, but not limited to, in situ welding of two ring pieces to form the ring, without departing from the broader aspects of the present invention.

Figure 9:
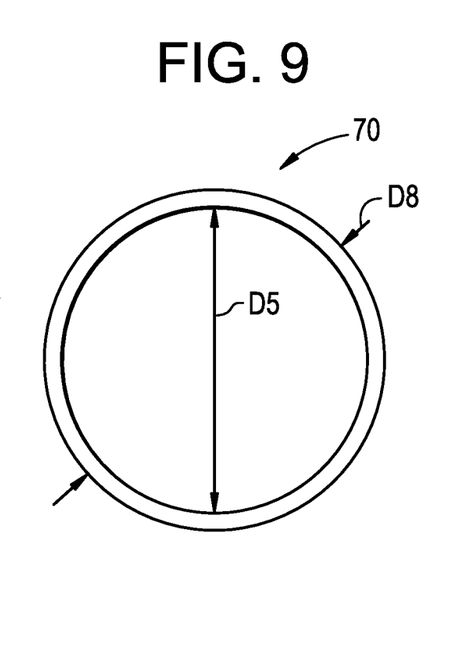
FIG. 9 is side view of a continuous retaining ring employed in the roller assembly of FIG. 2A.

As shown in FIGS. 3, 7 and 9, a second retainer ring or washer 70 is disposed and/or secured to (e.g., press fit, threaded, staked, pinned or welded) the retainer receiving surface 37 on the shaft 30. As shown in FIG. 9, the washer 70 has an inside diameter D5 that is slightly less than the diameter D3 of the retainer receiving surface 37 prior to securing to the retainer receiving surface. The washer 70 is a continuous, 360 degree extending, non-interrupted ring absent any slits or gaps therein. Thus, the washer 70 is press fit (e.g., interference fit) onto the retainer receiving surface 37.

Figure 5:
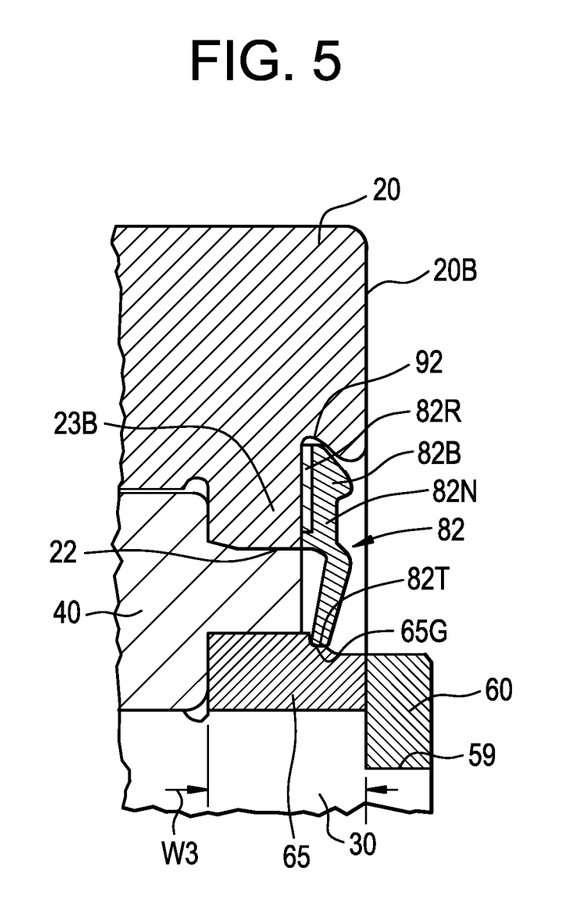
FIG. 5 is an enlarged view of a second seal area of the roller assembly of FIG. 2A.
Figure 10:
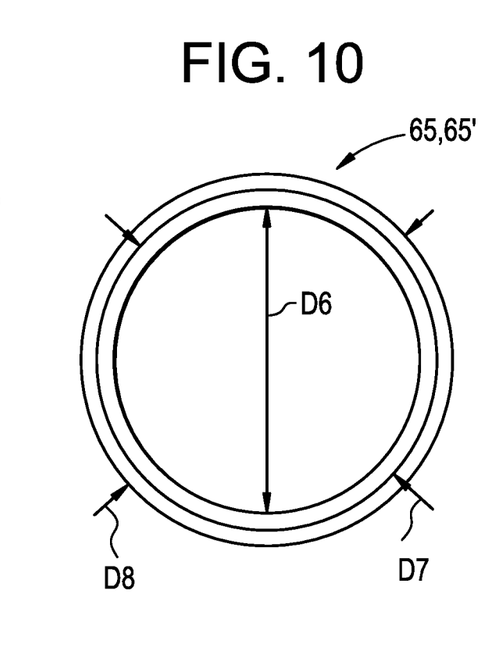
FIG. 10 is a side view of a continuous spacer ring employed in the roller assembly of FIG. 2A.

As shown in FIGS. 3 and 10, a first spacer ring 65 (e.g., annular shaped with a contoured radially outer surface) is disposed around and engages the exterior bearing surface 36. The first spacer ring 65 is positioned between the first row of the plurality of first rollers 40 and the first retainer ring 60. The first spacer ring 65 has an axial width W2. The first spacer ring 65 has an inside diameter D5 slightly greater than the diameter D2 of the exterior surface 36 of the shaft 30 to allow the first spacer ring 65 to be easily slid over the exterior surface 36 of the shaft 30 into position, as shown in FIG. 3. As shown in FIG. 5, the first spacer ring 65 has a contoured or stepped radially outer surface that includes a second seal receiving groove 65G for receiving a portion of a second annular seal 82, as described herein.

Figure 6:
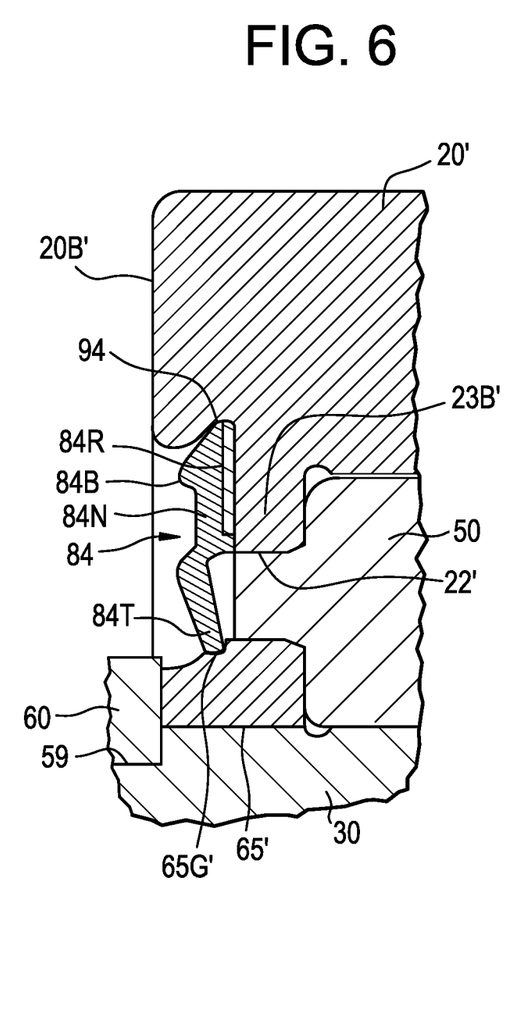
FIG. 6 is an enlarged view of a third seal area of the roller assembly of FIG. 2A.

As shown in FIGS. 3 and 10, a second spacer ring 65' (e.g., annular shaped with a contoured radially outer surface)

is disposed around and engages the exterior bearing surface 36. The second spacer ring 65' is positioned between the second row of the plurality of second rollers 50 and the first retainer ring 60. The second spacer ring 65' has an axial width W3. The second spacer ring 65' has an inside diameter slightly greater than the diameter D2 of the exterior surface 36 of the shaft 30 to allow the second spacer ring 65' to be easily slid over the exterior surface 36 of the shaft 30 into position, as shown in FIG. 3. As shown in FIG. 6, second spacer ring 65' has a contoured or stepped radially outer surface that includes a fourth seal receiving groove 65G' for receiving a portion of a fourth annular seal 84, as described herein.

Referring to FIGS. 3, 8, 9 and 10, the outer diameter of the washer 70 and spacer rings 65, 65' is substantially the same (denoted as D8). D8 is larger than the outer diameter D10 of the retainer ring 60. In the depicted embodiment, D8 is roughly 90% of the diameter D9, measured between the centers of the rollers 40, 50. The diameter ratio of D8/D9 is between 0.5 and 1.0 and the diameter ratio is preferably between 0.85 and 0.95. This ratio ensures that the rollers 40, 50 are axially retained, maintaining the sliding relationship between the roller end 51 and interior axial wall 74 of the washer 70, the axial ends of the rollers 40 with the spacer 65, and the axial ends of the roller with the spacer 65' without impacting the performance of the roller assembly.

As shown in FIG. 3, the first outer ring 20 is axially retained on the first row of the plurality of first rollers 40 by and between the first axially inward facing abutment surface 25A and the second axially inward facing abutment surface 25B. The first row of the plurality of first rollers 40 and the first spacer ring 65 are axially retained on the shaft by and between the head flange 32 and the first retainer ring 60.

As shown in FIG. 3, the second outer ring 20' is axially retained on the second row of the plurality of second rollers 50 by and between the third axially inward facing abutment surface 25A' and the fourth axially inward facing abutment surface 25B'. The second row of the plurality of second rollers 50 and the second spacer ring 65' are axially retained on the shaft by and between the first retainer ring 60 and the washer 70.

As shown in FIGS. 2A and 3, the first spacer ring 65, the second spacer ring 65' and the first retainer ring 60 are configured to space the first outer ring 20 apart from and in a predetermined axial relation to the second outer ring 20' so that the first outer ring 20 and the second outer ring 20' are rotatable and operable independent of one another. In embodiments with additional outer rings, e.g., a third outer ring, fourth outer ring, etc., additional spacer rings and retainer rings, as described above, are configured to space these additional outer rings from and in a predetermined axial relation to each other, as well as from the first outer ring 20 and the second outer ring 20', so that each outer ring is rotatable and operable independent from each other outer ring. For example, the independent rotation of the first outer ring 20 and the second outer ring 20' includes rotating in different or common circumferential directions around the shaft 30, at different or common angular speeds around the shaft 30, at different or common angular accelerations around the shaft 30. In addition, the first outer ring 20 and the second outer ring 20' are configured operate and be subject to: (1) different or similar radial loads' (2) different or similar thrust loads; and/or (3) different or similar impact loads.

As shown in FIG. 3, the first spacer ring 65, the second spacer ring 65' and the first retainer ring 60 are configured to space the first outer ring 20 apart from the second outer ring 20' by an axial gap G. The widths W1 and W2 of the groove 59 and the first retainer ring 60, respectively, are of a predetermined magnitude to establish the magnitude of the gap G. In one embodiment the gap G is between about 1.5 mm and 1.8 mm. In one embodiment, the gap G is between about 10 percent and 12 percent of an overall axial length L1 (see FIG. 2A) of the first outer ring 20. In one embodiment, the gap G is between about 10 percent and 12 percent of an overall axial length L2 (see FIG. 2A) of the second outer ring 20'. In one embodiment, the axial lengths L1 and L2 are substantially equal. In one embodiment, the axial length L1 is greater than the axial length L2. In one embodiment, the axial length L2 is greater than the axial length L1.

As shown in FIG. 2A, the axial width W3 of the first spacer ring 65 is of a predetermined magnitude to establish the magnitude of the gap G; and/or the axial width W4 of the second spacer ring 65' is of a predetermined magnitude to establish the magnitude of the gap G. In one embodiment, a combination of: (1) the widths W1 and W2 of the groove 59 and the first retainer ring 60, respectively; (2) the axial width W3 of the first spacer ring 65; and (3) the axial width W4 of the second spacer ring 65' are of predetermined magnitudes to establish the magnitude of the gap G.

As shown in FIG. 2B, a third row of a plurality of third rollers 50' is positioned in the third interior area 21" of the first outer ring 20", between and in rolling engagement with the exterior bearing surface 36" and the third radially inward facing bearing surface 22B'". The rollers 50 are, preferably, needle type of cylindrical rollers. A second retainer ring 60' is disposed in the groove 59'. A portion of the second retainer ring 60' extends radially outward from the groove 59' and is maintained in a fixed axial position in the groove 59' by opposing side walls 59E' and 59F' of the groove 59'.

The axial width W5 of the third spacer ring 65" is of a predetermined magnitude to establish the magnitude of the gap G'; and/or the axial width W6 of the fourth spacer ring 65'" is of a predetermined magnitude to establish the magnitude of the gap G'. In one embodiment, a combination of: (1) the widths W1 and W2 of the groove 59' and the second retainer ring 60', respectively; (2) the axial width W5 of the third spacer ring 65"; and (3) the axial width W6 of the fourth spacer ring 65'" are of predetermined magnitudes to establish the magnitude of the gap G'. In some embodiments, the gaps G and G' are substantially the same in magnitude.

The second retainer ring 60' has an axial width W2' that is about equal to or slightly less than the width W1' of the groove 59'. Third and fourth spacer rings 65", 65'" (e.g., annular shaped with a contoured radially outer surface) are disposed around and engage the exterior bearing surface 36'. The third spacer ring 65" is positioned between the second row of the plurality of second rollers 50 and the second retainer ring 60' and the fourth spacer ring 65'" is positioned between the third row of the plurality of third rollers 50' and the second retainer ring 60'. The second spacer ring 65' has an axial width W2'. The second spacer ring 65' has an inside diameter slightly greater than the diameter D2 of the exterior surface 36' of the shaft 30 to allow the second spacer ring 65' to be easily slid over the exterior surface 36' of the shaft 30 into position, as shown in FIG. 2B.

Figure 4:
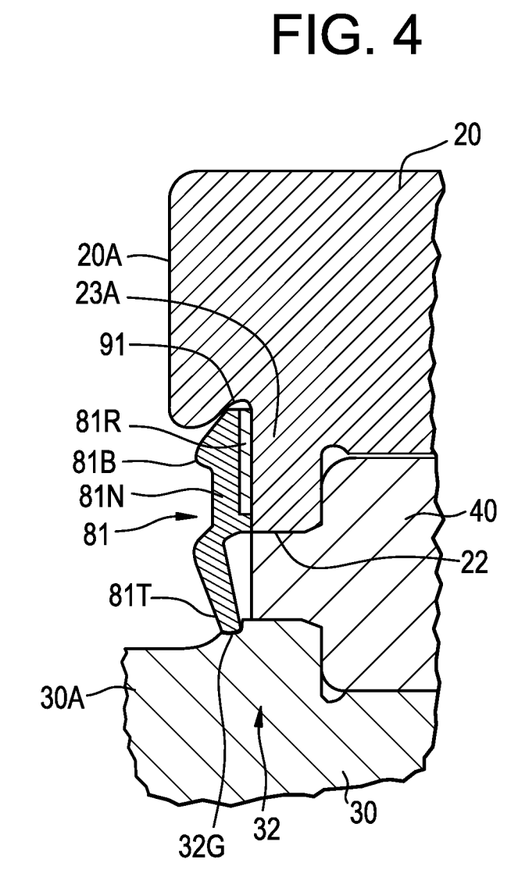
FIG. 4 is an enlarged view of a first seal area of the roller assembly of FIG. 2A.

As shown in FIG. 4, the first inner surface 22 defines a first seal receiving pocket 91 between the first radially inwardly extending flange 23A and the first axial end 20A. A first annular seal 81 is positioned in and seated in the first seal receiving pocket 91. A portion of the first annular seal 81 slidingly and sealingly engaging a portion of the head flange 32. The first annular seal 81 has a base 81B and neck portion 81N extending from the base 81B and terminating at a sealing tip 81T. A retaining ring 81R engages (e.g., secured to, adhered to, embedded in or in frictional contact) with a portion of the base 81B. The base 81B and the retaining ring 81R are seated (e.g., fixedly secured in, slidingly engaged with, press fit in, frictionally fit in or adhered to) in the first seal receiving pocket 91. The sealing tip 81T is seated in and slidingly engages a first seal receiving groove 32G formed in a radially outward facing portion of the head flange 32 to provide sealing engagement therebetween.

As shown in FIG. 5, the first inner surface 22 defines a second seal receiving pocket 92 between the second radially inwardly extending flange 23B and the second axial end 20B. A second annular seal 82 is positioned in and seated in the second seal receiving pocket 92. A portion of the second annular seal 82 slidingly and sealingly engages a portion of the first spacer ring 65. The second annular seal 82 has a base 82B and neck portion 82N extending from the base 82B and terminating at a sealing tip 82T. A retaining ring 82R engages (e.g., secured to, adhered to, embedded in or in frictional contact) with a portion of the base 82B. The base 82B and the retaining ring 82R are seated (e.g., fixedly secured in, slidingly engaged with, press fit in, frictionally fit in or adhered to) in the second seal receiving pocket 92. The sealing tip 82T is seated in and slidingly engages the second seal receiving groove 65G in the first spacer ring 65 to provide sealing engagement therebetween.

As shown in FIG. 7, the second inner surface 22' defines a third seal receiving pocket 93 formed between the third radially inwardly extending flange 23A' and the third axial end 20A'. A third annular seal 83 is positioned in and seated in the third seal receiving pocket 93. A portion of the third annular seal 83 slidingly and sealingly engages a portion of the washer 70.

The third annular seal 83 has a base 83B and neck portion 83N extending from the base 83B and terminating at a sealing tip 83T. A retaining ring 83R engages (e.g., secured to, adhered to, embedded in or in frictional contact) with a portion of the base 83B. The base 83B and the retaining ring 83R are seated (e.g., fixedly secured in, slidingly engaged with, press fit in, frictionally fit in or adhered to) in the third seal receiving pocket 93. The sealing tip 83T is seated in and slidingly engages a third seal receiving groove 70G formed in a radially outward facing portion of the washer 70 to provide sealing engagement therebetween.

As shown in FIG. 6, the second inner surface 22' defines a fourth seal receiving pocket 94 formed between the fourth radially inwardly extending flange 23B' and the fourth axial end 20B'. A fourth annular seal 84 is positioned in and seated in the fourth seal receiving pocket 94. A portion of the fourth annular seal 84 slidingly and sealingly engaging a portion of the second spacer ring 65'.

The fourth annular seal 84 has a base 84B and neck portion 84N extending from the base 84B and terminating at a sealing tip 84T. A retaining ring 84R engages (e.g., secured to, adhered to, embedded in or in frictional contact) with a portion of the base 84B. The base 84B and the retaining ring 84R are seated (e.g., fixedly secured in, slidingly engaged with, press fit in, frictionally fit in or adhered to) in the fourth seal receiving pocket 94. The sealing tip 84T is seated in and slidingly engages the fourth seal receiving groove 65G' in the second spacer ring 65' to provide sealing engagement therebetween.

In one embodiment, the first annular seal 81, the second annular seal 82, the third annular seal 83 and/or the fourth annular seal 84 is made from an elastomeric material.

In embodiments with additional outer rings, e.g., a third outer ring, fourth outer ring, etc., additional seal receiving pockets, annular seals, etc., are incorporated and configured to these additional outer rings in order to provide sealing engagement consistent with the embodiments shown in FIGS. 4-7 described above.

The shaft 30 is manufactured from a carbon steel alloy such as AISI 51200. A portion of the shaft has a carburized case hardened case depth of 0.76 to 1.02 millimeters (0.03 to 0.04 inches), a surface hardness of 59 to 62 Rockwell C scale, and/or a core hardness of 30 to 35 Rockwell C scale.

Although the present invention has been disclosed and described with reference to certain embodiments thereof, it should be noted that other variations and modifications may be made, and it is intended that the following claims cover the variations and modifications within the true scope of the invention.

What is claimed is:

1. A roller assembly for a cam follower, the roller assembly comprising:

a first outer ring having a first interior area, the first interior area being defined by a first inner surface extending between a first axial end and a second axial end of the first outer ring, the first inner surface having a first radially inward facing bearing surface extending between a first radially inwardly extending flange and a second radially inwardly extending flange, the first radially inwardly extending flange has a first axially inward facing abutment surface and the second radially inwardly extending flange has a second axially inward facing abutment surface;

a second outer ring having a second interior area, the second interior area being defined by a second inner surface extending between a third axial end and a fourth axial end of the second outer ring, the second inner surface having a second radially inward facing bearing surface extending between a third radially inwardly extending flange and a fourth radially inwardly extending flange, the third radially inwardly extending flange having a third axially inward facing abutment surface and the fourth radially inwardly extending flange having a fourth axially inward facing abutment surface;

a one piece shaft extending into the first interior area and the second interior area, the shaft extending continuously between a terminal axial end and a mounting axial end of the shaft, the shaft having a head flange extending radially outward from the shaft proximate the terminal axial end, the head flange having a fifth axially inward facing abutment surface, and the shaft having an exterior bearing surface extending between the fifth axially inward facing abutment surface and a circumferentially extending retainer receiving surface, the retainer receiving surface being located between the terminal axial end and the mounting axial end and the shaft has a circumferential groove extending around the shaft, the groove being located between the terminal axial end and the retainer receiving surface;

a first row of a plurality of first rollers positioned in the first interior area between and in rolling engagement with the exterior bearing surface- and the first radially inward facing bearing surface and disposed between the first axially inward facing abutment surface and the second axially inward facing abutment surface of the first outer ring;

a second row of a plurality of second rollers positioned in the second interior area between and in rolling engagement with the exterior bearing surface and the second radially inward facing bearing surface and disposed between the third axially inward facing abutment surface and the fourth axially inward facing abutment surface;

a first retainer ring disposed in the groove, a portion of the first retainer ring extending radially outward from the groove;

a washer secured to the retainer receiving surface;

a first spacer ring disposed around and engaging the exterior bearing surface, the first spacer ring being positioned between the first row of the plurality of first rollers and the first retainer ring;

a second spacer ring disposed around and engaging the exterior bearing surface, the second spacer ring being positioned between the second row of the plurality of second rollers and the first retainer ring;

the first outer ring being axially retained on the first row of the plurality of first rollers;

the first row of the plurality of first rollers and the first spacer; being axially retained on the shaft between the head flange and the first retainer ring;

the second outer ring being axially retained on the second row of the plurality of second rollers;

the second row of the plurality of second rollers and the second spacer; being axially retained on the shaft between the first retainer ring and the washer, wherein at least one of the first spacer ring, the second spacer ring and the first retainer ring being configured to axially space the first row of the plurality of first rollers from the second row of the plurality of second rollers, and the first outer ring being spaced apart from the second outer ring a predetermined axial distance that allows the first outer ring and the second outer ring to rotate independent of one another.

2. The roller assembly of claim 1, wherein:
the first inner surface further comprises a seal receiving pocket formed between the first radially inwardly extending flange and the first axial end;
an annular seal positioned in and seated in the seal receiving pocket, a portion of the annular seal slidingly and sealingly engaging a portion of the head flange.

3. The roller assembly of claim 2, wherein the annular seal comprises an elastomeric material.

4. The roller assembly of claim 1, wherein:
the first inner surface further comprises a seal receiving pocket formed between the second radially inwardly extending flange and the second axial end;
an annular seal positioned in and seated in the seal receiving pocket, a portion of the annular seal slidingly and sealingly engaging a portion of the first spacer ring.

5. The roller assembly of claim 4, wherein the annular seal comprises an elastomeric material.

6. The roller assembly of claim 1, wherein:
the second inner surface further comprises a seal receiving pocket formed between the third radially inwardly extending flange and the third axial end;
an annular seal positioned in and seated in the seal receiving pocket, a portion of the annular seal slidingly and sealingly engaging a portion of the washer.

7. The roller assembly of claim 6, wherein the annular seal comprises an elastomeric material.

8. The roller assembly of claim 1, wherein:
the second inner surface further comprises a seal receiving pocket formed between the fourth radially inwardly extending flange and the fourth axial end;
an annular seal positioned in and seated in the seal receiving pocket, a portion of the annular seal slidingly and sealingly engaging a portion of the second spacer ring.

9. The roller assembly of claim 8, wherein the annular seal comprises an elastomeric material.

10. The roller assembly of claim 1, wherein the shaft comprises a carbon steel.

11. The roller assembly of claim 1, wherein a portion of the shaft has a carburized case hardened case depth of 0.76 to 1.02 millimeters.

12. The roller assembly of claim 1, wherein the shaft has a surface hardness of 59 to 62 Rockwell C scale.

13. The roller assembly of claim 1, wherein the shaft has a core hardness of 30 to 35 Rockwell C scale.

14. The roller assembly of claim 1, wherein the shaft extends outwardly from at least one of the first axial end and the second axial end.

15. A roller assembly for a cam follower, the roller assembly comprising:
a first outer ring having a first interior area, the first interior area being defined by a first inner surface extending between a first axial end and a second axial end of the first outer ring, the first inner surface having a first radially inward facing bearing surface extending between a first radially inwardly extending flange and a second radially inwardly extending flange, the first radially inwardly extending flange has a first axially inward facing abutment surface and the second radially inwardly extending flange has a second axially inward facing abutment surface;
a second outer ring having a second interior area, the second interior area being defined by a second inner surface extending between a third axial end and a fourth axial end of the second outer ring, the second inner surface having a second radially inward facing bearing surface extending between a third radially inwardly extending flange and a fourth radially inwardly extending flange, the third radially inwardly extending flange having a third axially inward facing abutment surface and the fourth radially inwardly extending flange having a fourth axially inward facing abutment surface;
a third outer ring having a third interior area, the third interior area being defined by a third inner surface extending between a fifth axial end and a sixth axial end of the third outer ring, the third inner surface having a third radially inward facing bearing surface extending between a fifth radially inwardly extending flange and a sixth radially inwardly extending flange, the fifth radially inwardly extending flange has a fifth axially inward facing abutment surface and the sixth radially inwardly extending flange has a sixth axially inward facing abutment surface;
a one piece shaft extending into the first interior area, the second interior area and the third interior area, the shaft extending continuously between a terminal axial end and a mounting axial end of the shaft, the shaft having a head flange extending radially outward from the shaft proximate the terminal axial end, the head flange having a seventh axially inward facing abutment surface, and the shaft having an exterior bearing surface extending between the seventh axially inward facing abutment surface and a circumferentially extending retainer receiving surface, the retainer receiving surface being located between the terminal axial end and the mounting axial end and the shaft having a first circumferential groove extending around the shaft and a second circumferential groove extending around the shaft, the first groove being located between the terminal axial end and the retainer receiving surface, the second groove being located between the first groove and the retainer receiving surface;

a first row of a plurality of first rollers positioned in the first interior area between and in rolling engagement with the exterior bearing surface and the first radially inward facing bearing surface and disposed between the first axially inward facing abutment surface and the second axially inward facing abutment surface;

a second row of a plurality of second rollers positioned in the second interior area between and in rolling engagement with the exterior bearing surface and the second radially inward facing bearing surface and disposed between the third axially inward facing abutment surface and the fourth axially inward facing abutment surface;

a third row of a plurality of third rollers positioned in the third interior area between and in rolling engagement with the exterior bearing surface and the third radially inward facing bearing surface and disposed between the fifth axially inward facing abutment surface and the sixth axially inward facing abutment surface;

a first retainer ring disposed in the first groove, a portion of the first retainer ring extending radially outward from the first groove;

a second retainer ring disposed in the second groove, a portion of the second retainer ring extending radially outward from the groove;

a first spacer ring disposed around and engaging the exterior bearing surface, the first spacer ring being positioned between the first row of the plurality of first rollers and the first retainer ring;

a second spacer ring disposed around and engaging the exterior bearing surface, the second spacer ring being positioned between the second row of the plurality of second rollers and the first retainer ring;

a third spacer ring being positioned between the second row of the plurality of second rollers and the second retainer ring;

a fourth spacer ring being positioned between the third row of the plurality of third rollers and the second retainer ring;

a washer secured to the retainer receiving surface;

the first outer ring being axially retained on the first row of the plurality of first rollers;

the first row of the plurality of first rollers and the first spacer being axially retained on the shaft between the head flange and the first retainer ring;

the second outer ring being axially retained on the second row of the plurality of second rollers;

the second row of the plurality of second rollers, the second spacer and the third spacer being axially retained on the shaft between the first retainer ring and the second retainer ring;

the third outer ring being axially retained on the third row of the plurality of third rollers; and the third row of the plurality of third rollers and the fourth spacer being axially retained on the shaft between the second retainer ring and the washer, wherein at least one of the first spacer ring, the second spacer ring and the first retainer ring being configured to axially space the first row of the plurality of first rollers from the second row of the plurality of second rollers, the first outer ring being spaced apart from the second outer ring a predetermined axial distance that allows the first outer ring and the second outer ring to rotate independent of one another, and at least one of ring the third spacer ring, the fourth spacer ring and the second retainer ring being configured to space the second row of the plurality of second rollers from the third row of the plurality of third rollers, and the second outer ring being spaced apart from the third outer ring a predetermined axial distance that allows the second outer ring and the third outer ring to rotate independent of one another.

\* \* \* \* \*